(12) United States Patent
Bruce et al.

(10) Patent No.: US 8,147,727 B2
(45) Date of Patent: Apr. 3, 2012

(54) METHODS AND SYSTEMS FOR FORMING OPHTHALMIC LENS MOLD ASSEMBLIES

(75) Inventors: Ian Bruce, Southampton (GB); Robert Oag, Southampton (GB); Stuart Bailey, Southampton (GB); Stephen Saunders, Southampton (GB)

(73) Assignee: Coopervision International Holding Company, LP, St. Michael (BB)

( * ) Notice: Subject to any disclaimer, the term of this patent is extended or adjusted under 35 U.S.C. 154(b) by 120 days.

(21) Appl. No.: 12/763,543

(22) Filed: Apr. 20, 2010

(65) Prior Publication Data

US 2010/0201009 A1    Aug. 12, 2010

Related U.S. Application Data

(63) Continuation of application No. 11/754,870, filed on May 29, 2007, now Pat. No. 7,731,872.

(60) Provisional application No. 60/803,524, filed on May 31, 2006.

(51) Int. Cl.
*B29D 11/00* (2006.01)

(52) U.S. Cl. ....... 264/1.36; 249/160; 249/168; 425/808; 156/73.1

(58) Field of Classification Search ................ 264/1.36, 264/160, 168; 156/73.1; 425/808; 249/160, 249/168
See application file for complete search history.

(56) References Cited

U.S. PATENT DOCUMENTS

| | | | |
|---|---|---|---|
| 4,208,364 A | 6/1980 | Shepherd | |
| 5,087,015 A | 2/1992 | Galley | |
| 5,114,629 A * | 5/1992 | Morland et al. | 264/2.2 |
| 5,271,875 A | 12/1993 | Appleton et al. | |
| 5,648,024 A | 7/1997 | Galas | |
| 5,658,602 A | 8/1997 | Martin et al. | |
| 5,759,318 A * | 6/1998 | Galas | 156/73.1 |
| 6,039,899 A | 3/2000 | Martin et al. | |
| 6,220,845 B1 | 4/2001 | Martin et al. | |
| 6,405,993 B1 | 6/2002 | Morris | |
| 6,514,436 B1 | 2/2003 | Dobner | |
| 6,627,124 B1 | 9/2003 | Herbrechtsmeier et al. | |
| 6,739,569 B2 | 5/2004 | Bickert | |

(Continued)

OTHER PUBLICATIONS

International Search Report completed Aug. 5, 2008 and mailed Aug. 8, 2008 from related PCT Application No. PCT/IB07/04339, filed May 30, 2007 (3 pages).
Written Opinion of the International Searching Authority completed Aug. 5, 2008 and mailed Aug. 8, 2008 from related PCT Application No. PCT/IB07/04339, filed May 30, 2007 (7 pages).
Office Action mailed Apr. 28, 2009 from corresponding U.S. Appl. No. 11/754,870.

(Continued)

*Primary Examiner* — Matthew Daniels
*Assistant Examiner* — Jacob Thomas Minskey
(74) *Attorney, Agent, or Firm* — Klein, O'Neill & Singh, LLP

(57) ABSTRACT

Methods and systems are provided for making an ophthalmic lens. The present methods and systems are effecting in coupling two mold sections together at two or more discrete regions. Embodiments of the methods and systems form a bore that extends completely through one of the mold sections and only partially through the other mold section. During formation of the bore, the mold material in proximity to the bore being foamed becomes molten and diffuses from the bore. A portion of the molten mold material is provided at a contact point between the two mold sections and when the molten material cools, the material foams a spot weld between the mold sections. By foaming multiple hollow spot welds in a mold assembly, the two mold sections can be securely coupled to each other during the manufacture of an ophthalmic lens, such as a silicone hydrogel contact lens.

26 Claims, 3 Drawing Sheets

U.S. PATENT DOCUMENTS

| | | | |
|---|---|---|---|
| 6,800,225 | B1 | 10/2004 | Hagmann et al. |
| 7,320,587 | B2 | 1/2008 | Goodenbough et al. |
| 2004/0119176 | A1 | 6/2004 | Xia et al. |
| 2004/0178541 | A1 | 9/2004 | Kelly et al. |
| 2004/0256747 | A1 | 12/2004 | Su et al. |
| 2007/0035051 | A1* | 2/2007 | Darnton et al. .............. 264/1.32 |

OTHER PUBLICATIONS

Office Action mailed Jul. 27, 2009 from corresponding U.S. Appl. No. 11/754,870.

Notice of Allowance mailed Feb. 5, 2010 from corresponding U.S. Appl. No. 11/754,870.

* cited by examiner

METHODS AND SYSTEMS FOR FORMING OPHTHALMIC LENS MOLD ASSEMBLIES

CROSS-REFERENCE TO RELATED APPLICATIONS

This is a continuation of application Ser. No. 11/754,870, filed May 29, 2007, which claims the benefit of U.S. Provisional Application No. 60/803,524, filed May 31, 2006, the entire contents of which are hereby expressly incorporated herein by reference.

FIELD

The present invention generally relates to devices, systems, and methods for producing ophthalmic lenses, such as silicone hydrogel contact lenses, or contact lenses that comprise a silicone hydrogel material. More particularly, the invention relates to methods and systems for coupling mold sections together to form contact lens mold assemblies, as well as contact lens mold assemblies produced using the methods and systems.

BACKGROUND

One method of manufacturing ophthalmic lenses, such as intraocular lenses and contact lenses, is by cast molding cast molding of contact lenses is well known. See, for example, Appleton, et al., U.S. Pat. No. 5,466,147, Morris, U.S. Pat. No. 6,405,993, and Dean, U.S. Pat. No. 6,732,993.

In a contact lens cast molding process, a single mold assembly for molding a single contact lens product includes a female mold section having a concave optical surface defining an anterior surface of a lens to be made, and a male mold section having a convex optical surface defining a posterior surface of the lens to be made. Thus, when the male and female mold sections are assembled together, a contact lens shaped cavity is formed between the concave surface of the female section and the convex surface of the male section.

A process for cast molding a lens is as follows. A polymerizable lens material, for example a monomeric material or other lens precursor material is placed on a concave surface of a contact lens mold section. This is usually done by dispensing a volume of a lens precursor material onto a mold half or mold section.

Once filled, a second mold section is placed in contact with the first mold section to form a lens shaped cavity containing the lens precursor material.

One type of coupling of the first mold section and second mold section utilizes an interference fit between the first and second mold sections. For example, the second mold section may be held in place relative to the first mold section by a pressure fit provided by a portion of the first mold section acting on a portion of the second mold section.

Another type of coupling is referred to as a point contact coupling. With point contact mold sections, the first and second mold sections are placed in contact with each other, and require an additional coupling mechanism to hold the two mold sections together. For example, two point contact mold sections can be held together by physically clamping the mold sections together. Or, two point contact mold sections can be held together by fusing a portion of the two mold sections together. For example, U.S. Pat. No. 5,759,318 describes the use of ultrasonic energy to secure two mold sections together.

The type of coupling used to form the contact lens mold assemblies often relates to the type of material used to produce the mold sections. For example, more elastic or flexible polymeric materials, such as relatively non-polar or hydrophobic polymeric resins, may be used to form interference fit mold sections. In comparison, more rigid or inflexible polymeric materials, such as relatively polar or hydrophilic polymeric materials, may be used to form point contact mold sections.

After closing the two mold sections to form a contact lens mold assembly, the contact lens precursor material is cured for example, by applying heat and/or light or other suitable polymerizing means to the filled mold assembly, thereby producing a polymerized contact lens product between the mold sections. The contact lens product is then removed from the mold sections. The contact lens product is often an unfinished contact lens which is subjected to one or more finishing steps, for example, conventional finishing steps such as extraction and/or hydration, to produce the final contact lens.

In the formation of silicone hydrogel contact lenses, the use of relatively hydrophilic polymeric resins or polar resins, such as Soarlite S (Nippon Gohsei Ltd., Japan), is beneficial in producing silicone hydrogel contact lenses with ophthalmically desirable surface wettabilities without requiring a surface treatment or polymeric internal wetting agent in the contact lens. One obstacle associated with cast molding processes involves maintaining the appropriate placement and fixation of the mold sections, particularly after the lens precursor material has been placed between the mold sections and prior to polymerization thereof. When ultrasonic energy is used to secure two mold sections together, opacification, pitting, or bubble formation in the lens cup (e.g., the region of the mold section containing the lens precursor material) may occur. Further, it may also be difficult to form a mold assembly in which the lens precursor material has a substantially uniform thickness, or in other words the lens does not have an undesired prism due to thickening of the lens precursor material at one region of the lens cup relative to another different region.

In addition, because of the potentially fragile nature of the polymerized contact lens product, the mold sections should be separable without causing breakage of or damage to the lens product.

Thus, more effective, more reliable methods and systems for manufacturing lenses, for example methods and systems for coupling mold sections during manufacturing of contact lenses, are needed.

SUMMARY

The present methods and systems are generally directed to securing together individual contact lens mold sections of a mold assembly filled with a contact lens precursor material, for example, a silicone hydrogel contact lens precursor material, such that the secured, filled mold sections remain fixed relative to each other during one or more downstream contact lens manufacturing steps, such as up to and including the polymerization of the precursor material. The systems and methods are suitable for automated manufacture of contact lenses, such as silicone hydrogel contact lenses, including daily wear and extended or continuous wear lenses. The present methods and systems include forming a plurality of contact welds or spot welds located radially away from the contact lens shaped cavity of the mold assembly.

In a broad aspect of the invention, methods and systems for making ophthalmic lenses, for example silicone hydrogel contact lenses, are provided. The present methods and systems are effective in forming a plurality of hollow spot welds between first and second mold sections to secure the first and second mold sections together as a mold assembly. The methods include forming one or more bores into a discrete region(s) of the first mold section and forming one or more bores into a discrete region(s) of the second mold section. The bore in the first mold section extends completely through the region of the mold section. The bore in the second mold section only extends through a portion of the second mold section. For example, the bore does not extend completely through the mold section. The bore is formed by softening or melting the mold material at the region. The softened or molten mold material passes from the bore. Softened or molten mold material occupies a space between the first and second mold sections, and when the mold material cools or hardens, it acts as weld or an attachment between the first and second mold sections. With the present methods and systems, two point contact mold sections can be attached together without forming a bore completely through both mold sections, without being associated with stringing of molten mold material, and/or without causing defects in polymerized lenses obtained from such mold assemblies.

As described herein, the bores can be formed in the mold sections by applying energy, including heat or ultrasonic energy, to cause a portion of the mold material to soften or melt. The energy can be delivered in a continuous manner or in a pulsatile manner. Embodiments of the present methods and systems can include delivery of a coolant to or near the bore to cool the bore forming element and the molten mold material. Embodiments of the present methods and systems can include forming the bores in two mold sections that are substantially identical in structure. Embodiments of the present methods and systems can include passing a tip of a bore forming element through the mold sections. The tip has a distal end effective in forming the bores described herein. In certain embodiments, the tip has a conical distal end with a planar distal end surface. In other embodiments, the tip has a chiseled distal end with a planar distal end surface. In other embodiments, the tip has a dome shaped or convex distal end surface. In certain embodiments, the tip has a bore extending to the distal end surface of the tip. The bore is effective in delivering a coolant, such as air or gas, to the distal end of the tip and the surrounding region of the mold section. In certain embodiments, a clamping device is used to provide a desired amount of pressure to the first and second mold sections during formation of the bores. In one embodiment of the present systems, a system comprises a housing, a heater cartridge, a sleeve, and a tip. The tip is attached to or extends from the sleeve. The sleeve contains the heater cartridge, and the sleeve is attached to the housing. In certain embodiments, the tip is releasably attached to the sleeve. The tip can be made of a variety of materials effective in softening or heating plastic materials. Examples of suitable tip materials include copper, aluminum, stainless steel, and alloys of elements including copper, nickel, bronze, and combinations thereof.

In accordance with some embodiments of the present invention, methods of attaching two mold sections together are provided. The methods may comprise providing first and second mold sections that are sized and adapted for the production of a contact lens, and placing the first and second mold sections together so as to define a cavity therebetween, for example, a contact lens shaped cavity. The first and second mold sections include first and second peripheral regions, respectively, extending outward of the cavity.

Embodiments of the present methods further comprise the step of forming an open ended bore in the first peripheral region and a closed end bore in the second peripheral region. The step of forming the bores can comprise applying energy to the first and second peripheral regions thereby causing material from at least one of the first and second mold sections to soften, and/or accumulate in a space between the first and second mold sections. The accumulated material is in contact with the first and second peripheral regions thereby causing the mold sections to become fused together in an area adjacent the bores. The energy applied to the first and second peripheral regions can be selected from the group consisting of heat energy, ultrasonic energy and combinations thereof.

The forming step may be repeated at least once at different locations on the first and second peripheral regions. In some embodiments, the forming step includes substantially simultaneously forming a plurality of, for example, at least two, such as three, open ended bores and a plurality of, for example, at least two, such as three, closed end bores in the first and second peripheral regions, respectively. To enhance stability of the mold assembly during down stream processing, the open ended bores and closed end bores may be substantially equidistantly spaced apart around the cavity.

In a more specific aspect of the invention, the forming step comprises passing an elongated element through the first peripheral region and into the second peripheral region, and subsequently removing the elongated element from the first and second peripheral regions. Formation of the open ended bore and the closed end bore is thus made by forming a single passage or void that extends through the first peripheral region and partially into the second peripheral region. In other words, the passage or void does not extend completely through the second peripheral region or the peripheral region of the second mold section.

The method may also comprise providing a composition, for example, a contact lens composition, for example, a contact lens precursor composition, on at least one of the first and second mold sections so that the cavity defined between the first and second mold sections contains the composition. The composition may be a silicone hydrogel contact lens precursor composition.

Each of the contact lens mold sections used in the present methods, systems, and mold assemblies comprises a lens shaped portion or surface(s) and a flange or peripheral region circumscribing the lens shaped portion or surface(s). The flange or peripheral region can be understood to be a radially extending flange or peripheral region radially extending from the lens shaped surface. For example, a mold assembly for forming a contact lens may comprise first and second mold sections, wherein the first mold section includes a generally concave lens shaped surface defining an anterior surface of a contact lens, and the second mold section includes a generally convex lens shaped surface defining a posterior surface of a contact lens. The first mold section can be understood to be a female mold section and the second mold section can be understood to be a male mold section. When coupled together as a mold assembly, the first and second mold sections form a lens-shaped cavity between the lens shaped surface of the first mold section and the lens shaped surface of the second mold section. The mold assembly includes one or more regions where surfaces of the flanges of the assembled mold sections are in contact with one another. The first and second mold sections, when coupled together, form at least one contact region along the peripheral regions of the two mold section. In some embodiments, the contact region is a circumferential region, and in other embodiments the contact region comprises a non-circumferential contact region, and one or more gaps separate the non-circumferential contact regions.

In certain embodiments, the first and second mold sections are substantially identically structured relative to each other. In other words, the female and male mold sections are substantially identical, and each includes a concave lens forming surface and a convex lens forming surface. For example, each of the mold sections includes both a first lens shaped surface defining an anterior surface of a contact lens and a substantially opposing second lens shaped surface defining a posterior surface of a contact lens.

The methods for forming a contact lens may further comprise the step of placing a lens precursor composition on a lens shaped surface of a mold section. The composition may comprise a polymerizable contact lens precursor material having at least one polymerizable component, for example, a silicon containing polymerizable component.

Once the female mold section has received the polymerizable composition, the male mold section is placed in contact with the female mold section to form a contact lens mold assembly with the polymerizable contact lens precursor composition occupying the lens shaped cavity between the mold sections. The filled, coupled mold sections are then secured or joined together using the methods as described elsewhere herein.

In certain embodiments of the present methods, the mold sections are secured together by forming a plurality of spaced apart bores at points of contact between the peripheral regions of the first and second mold sections. The bore is formed using heat energy or ultrasonic energy or a combination thereof. For example, applying heat or ultrasonic energy at discrete regions around the lens shaped cavity, the two mold sections can be secured together by a two or more hollow spot welds formed between the peripheral regions of the first and second mold sections.

In one embodiment, the forming step comprises passing an energized elongated element having a heated tip through the first peripheral region and into the second peripheral region, preferably without fully penetrating through the thickness of the second peripheral region. The heated tip causes a portion of mold section, such a portion of the peripheral region, to become melted or softened. The molten mold material occupies a space between the first and second mold sections and when cool forms a weld or attachment between the first and second mold sections. After penetrating the first and second mold sections, the elongated element is withdrawn from the peripheral regions. The tip or distal end of the elongated element may be heated by pulsed heat or continuous heat. Ultrasonic energy may also be applied to the elongated element. For example, ultrasonic energy may be radiated from the distal tip of the elongated element to cause melting or softening of the mold material.

In certain embodiments, the distal tip of the elongated element is tapered or pointed.

The mold sections preferably comprise materials that can be effectively joined using such heat energy or ultrasonic energy. For example, in some embodiments, the mold sections comprise ethylene vinyl alcohol (EVOH) which is a material suitable for welding. It is to be appreciated that other materials may be used for making the lens mold sections, such as contact point mold sections of the present methods, systems, and assemblies.

Other methods of the invention may employ directing different types of energy into the mold assemblies to accomplish the bore formation step. For example, focused infrared radiation, radio frequency energy, and/or other frictional forms of heating may be applied to the peripheral regions to form the bores, which thereby causes fusion between the first peripheral region and second peripheral region by melting and subsequent cooling of material in the mold section contact area immediately circumscribing the bore.

In addition, in certain embodiments, the assembled mold sections are held in place during the bore formation step, for example, using a clamp, for example a pneumatically operable clamp structured to engage and hold the mold sections in place during the bore formation step. Alternate devices or methods may also be used, for example, mechanical clamps using plates or other suitable structures, between male and female mold sections.

Preferably, the fused or welded region created by the formation of the bores does not define a continuous ring around the lens cavity of the mold assembly. Rather, there are discrete welding or attachment regions, such as about three fused or welded regions located at discrete, spaced apart "points" about the cavity periphery. The first and second mold sections are thus, in effect, spot welded. The weld between the mold assemblies can be described as a hollow spot weld, as described herein.

Advantageously, the fused region or regions hold the mold sections together sufficiently securely to enable the mold assembly to be subjected to one or more post-fusion procedures without the mold assemblies becoming inadvertently misaligned or separated. Such post-fusion procedures may include, for example, subjecting the mold assembly to polymerizing radiation to polymerize the lens precursor material in the lens shaped cavity, and mechanical lifting and other transport of the mold assembly between various post-fusion processing stations.

For example, once the mold sections have been filled, assembled and joined, the polymerizable composition in the lens-shaped cavity of the mold assembly is cured or polymerized to form a polymerized contact lens product. In some embodiments, the precursor composition is polymerized by exposing the mold assemblies to polymerizing light, for example, ultraviolet light. The mold sections may then be demolded or separated to expose the contact lens product, for example, by passing or directing a separator, a cutting device, for example a blade, or other instrument through the fused region or regions and removing one of the mold sections from the contact lens product.

In a further aspect of the present invention, systems useful in making ophthalmic lenses are provided. The systems generally comprise a surface configured to carry or support a mold assembly in a substantially fixed location. The mold assembly may be an ophthalmic lens mold assembly described elsewhere herein, for example, a contact lens mold assembly including a first mold section and a second mold section assembled together so as to define a lens shaped cavity therebetween, the first and second mold sections having first and second peripheral regions, respectively, extending outward of the lens shaped cavity.

The system further comprises an elongated element having a distal tip and positioned and movable relative to the surface so that the distal tip passes, for example, in a distal direction, through the first peripheral region of the first mold section and into the second peripheral region of the second mold section, and then passes, for example, in a proximal direction, out of the second peripheral region and the first peripheral region.

In certain embodiments, the system comprises a plurality of the elongated elements, each of the elongated elements being positioned so that the distal tip passes through the first peripheral region and into the second peripheral region at a location spaced apart from, for example, equidistantly spaced apart from, where the other elongated element or elements so pass.

The system further comprises a source of energy operatively coupled to the elongated element or elements to provide energy to the elongated element or elements effective in allowing the distal end thereof to pass through the first peripheral region and into the second peripheral region. The source of energy provides at least one of heat energy or ultrasonic energy to the elongated element or elements.

In some embodiments, the source of energy continuously provides energy to the elongated element as the distal tip passes into and out of the first and second peripheral regions. In other embodiments, the source of energy intermittently provides energy to the elongated element as the distal tip passes into and out of the first and second peripheral regions.

In an especially advantageous embodiment, the source of energy provides heat energy to the elongated element. In addition, the system may further comprise a cooling assembly operatively coupled to the elongated element and effective to cool the resulting closed end bore and open ended bore at or after the time the elongated element is moved out of the first and second peripheral regions.

The system may further comprise a drive assembly operatively coupled to the elongated element and structured to move the distal tip of the elongated element into and out of the first and second peripheral regions. The drive assembly may include a loss motion spring.

The systems may be structured to operate automatically and/or robotically.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects of the present invention are apparent in the following detailed description and claims, particularly when considered in conjunction with the accompanying drawings in which like parts bear like reference numerals.

DETAILED DESCRIPTION

The present invention will typically be described herein with respect to methods and systems useful for the manufacture of contact lenses, though it is to be appreciated that, with appropriate modification thereto, the present methods and systems may be useful for the manufacture of other types of ophthalmic lenses and other moldable articles in general.

In the illustrated embodiments, the present systems, methods, assemblies, and components thereof are designed and/or structured to be useful in manufacturing silicone hydrogel contact lenses, or contact lenses that comprise a silicone hydrogel material. For example, the present systems, methods, and components thereof may be particularly useful in producing extended wear silicone hydrogel contact lenses, and/or daily wear silicone hydrogel contact lenses. However, as described herein, the present methods and systems may also be used to produce other biomedical devices that include moldable or polymerizable materials.

In one broad aspect of the invention, methods of making contact lenses are provided. The methods generally comprise at least one of the following steps of providing first and second mold sections, each mold section including a lens shaped surface, the first and second mold sections being structured to be coupled or placed together to form a lens-shaped cavity therebetween, providing a lens precursor material, for example a polymerizable lens precursor composition, in the lens shaped cavity of one mold section, causing the first and second mold sections to be coupled or placed together, fusing the coupled first and second mold sections together, and causing the polymerizable composition in the lens-shaped cavity to polymerize to form a lens shaped product.

Figure 1A:
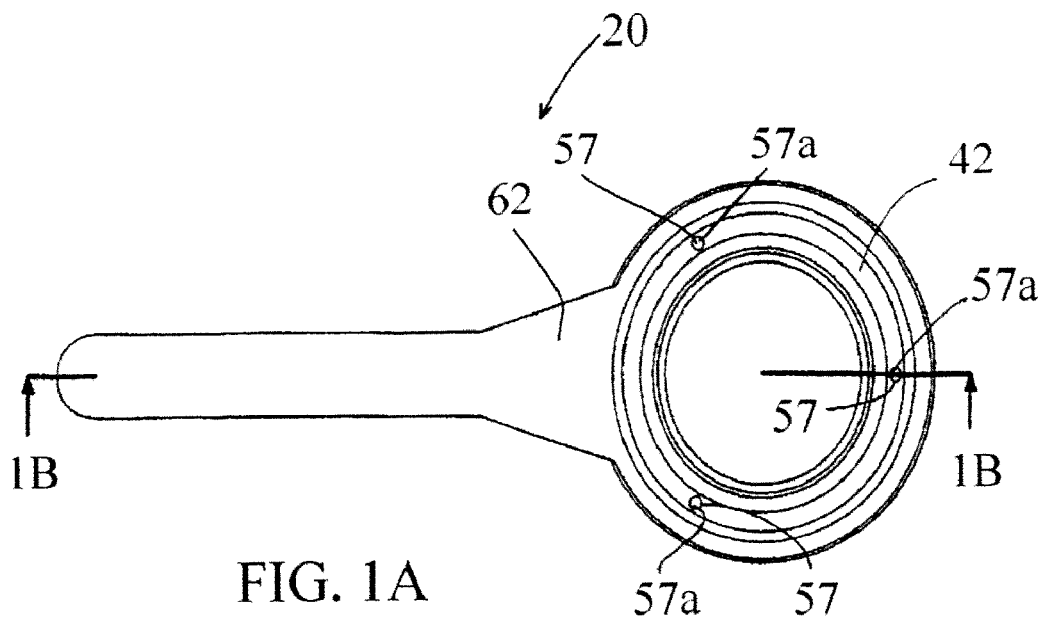
FIGS. 1A, 1B and 1C are, respectively, a top plan view, a cross-sectional view, and an enlarged cross-sectional view, of a mold assembly in accordance with an embodiment of the invention, the mold assembly including a first mold section and a second mold section assembled so as to define a contact lens shaped cavity therebetween and secured together using methods and systems disclosed herein.
Figure 1B:
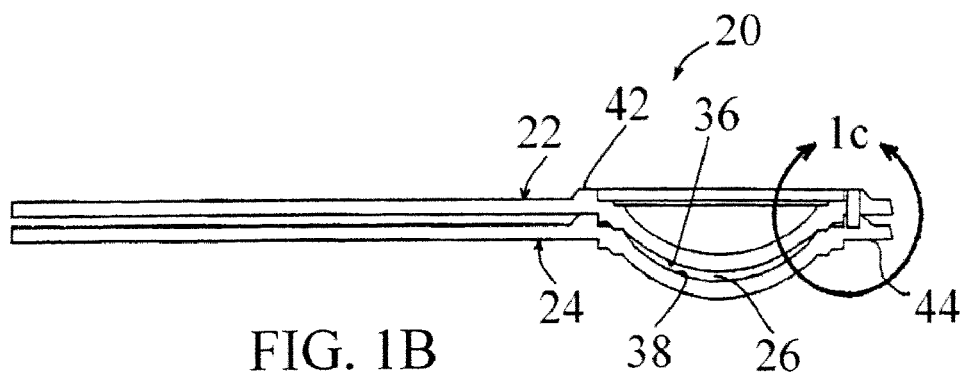
Figure 1C:
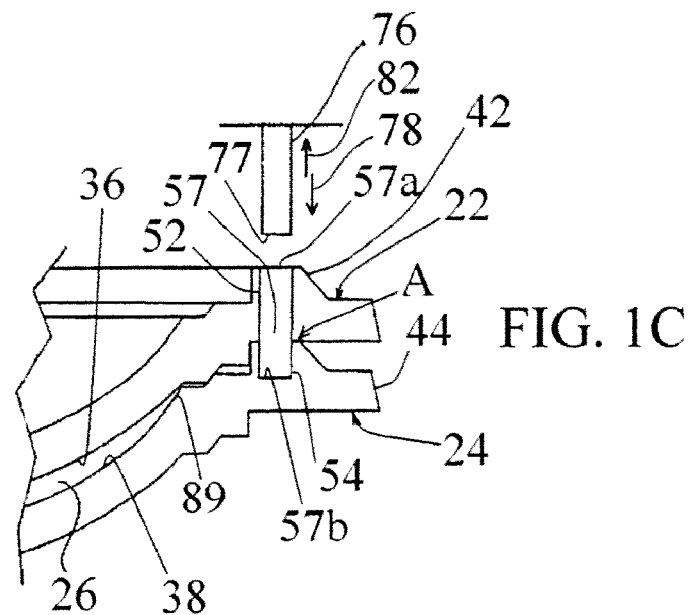

Turning now to FIGS. 1A, 1B, and 1C, a mold assembly 20 is provided which is useful for making an ophthalmic lens, such as a silicone hydrogel contact lens. As shown in FIGS. 1B and 1C, the molding assembly 20 generally comprises a first mold section 22 and a second mold section 24. When assembled as shown, the first and second mold sections 22 and 24 define a contact lens shaped cavity 26 therebetween.

The first mold section 22 includes a first cavity surface 36. First cavity surface 36 is a convex surface which forms the posterior surface of a contact lens. The second mold section 24 includes a second cavity surface 38. Second cavity surface 38 is a concave surface which forms the anterior surface of a contact lens.

In the mold assembly 20 shown in these figures, the first and second mold sections 22 and 24 are substantially identical in structure and form prior to being secured together. In other words, the mold sections 22 and 24 can be referred to as "universal" mold sections, in that each of the first mold section 22 and the second mold section 24 has both a first lens shaped surface defining a posterior lens surface, and a substantially opposing second lens shaped surface defining an anterior lens surface. Generally, such universal mold sections will have less than about a 5% difference in weight, radius or other property, relative to one another.

It is to be appreciated that in other embodiments, the mold assembly of the invention may comprise first and second mold sections that are not universal mold sections. For example, the first and second mold sections may not be substantially identically structured, and may be adapted for use with machinery or equipment designed for their different structures.

The first mold section 22 further includes a first peripheral region 42 extending outward of the first cavity surface 36, and the second mold section 24 includes a second peripheral region 44 extending outward of the second cavity surface 38. The first mold section 22 and the second mold section 24 contact each other at the first and second peripheral regions. Prior to securing the two mold sections together, the first and second mold sections are loosely arranged at a circumferential contact point surrounding the lens shaped cavity.

Referring now to FIG. 1C, when the mold sections 22 and 24 have been fused or attached together in accordance with aspects of the present methods, the first peripheral region 42 has an open ended bore 52 and the second peripheral region 44 has a closed end bore 54.

The open ended bore 52, for purposes of this disclosure, can be generally defined by a bore or channel that extends through the full thickness of the peripheral region of the mold section. Thus, the open ended bore 52 in first mold section 22 includes an opening at an exposed surface of the mold section, and, if considered apart from the second mold section, includes an opening at an opposing surface of the mold section.

Comparatively, the closed end bore 54, for purposes of this disclosure, can be generally defined by a bore or channel that has an open end on one surface of the mold section and a closed end at some depth beneath the open end. The closed end bore does not extend through a full thickness of the mold section. It can be described, for example, as a divot or depression in the mold section.

Formation of the open ended bore 52 and the closed end bore 54 in the assembled first and second mold sections 22 and 24 causes discrete regions of fusion between the mold sections 22 and 24. The open ended bore 52 and the closed end bore 54 together define a single channel 57 having an opening 57a and a closed end or terminus 57b.

As will be explained in greater detail herein, during formation of the channel 57, mold material from at least one of the first and second mold sections 22 and 24, respectively, becomes effective to attach the mold sections 22 and 24 together. An area A of attachment of the first and second mold sections 22 and 24 is located substantially adjacent the bores 52, 54 formed in the first and second peripheral regions 42 and 44, respectively.

Turning now to FIG. 1A, in the assembled mold assembly 20, a plurality of such bores (e.g. channels 57) are defined in the first and second peripheral regions 42 and 44. For example, the top plan view of the mold assembly 20 illustrates an outer surface 62 of the first mold section 22. As shown, the assembly 20 in this specific example includes three spaced apart, for example, equidistantly spaced apart, channels identified in the drawing by their respective channel openings 57a. The channels 57 comprise open ended bores in first peripheral region 42 aligned with closed end bores in the second peripheral region (not visible in FIG. 1A).

A method of the invention can comprise the steps of placing first and second mold sections, for example, mold sections 22 and 24, together so as to define a lens shaped cavity therebetween, and providing an ophthalmic lens composition on at least one of the first and second mold sections so that the lens shaped cavity includes the composition. The ophthalmic lens composition is a composition selected from the group consisting of ophthalmic lens compositions and ophthalmic lens precursor compositions.

In the illustrated embodiment, a contact lens precursor composition is provided in the cavity. The composition can comprise one or more silicon-containing components useful in the production of silicone hydrogels. For example, the present polymerizable compositions located in the contact lens shaped cavity of the mold assembly can include a polysiloxanyl dimethacrylate silicone monomer, or a combination of polysiloxanyl dimethacrylate silicone monomer and a polydimethylsiloxane methacrylate derivative. Examples of suitable compositions include those described in WO2006026474. The polymerizable lens precursor composition can be polymerized in the mold assembly using radiation, such as ultraviolet radiation, to form a polymerized silicone hydrogel contact lens product.

It will be appreciated by persons of ordinary skill in the art that the methods and systems in accordance with the invention, possibly with appropriate modifications thereto, can be utilized in the demolding of other types of molded lenses formed from other polymerizable composition formulations, and all such modified methods and systems are considered to be within the scope of the present invention.

The present methods comprise forming an open ended bore in a peripheral region of the first mold section and a closed end bore in the peripheral region of the second mold section so as to cause material, for example, a softened or melted bleb of material or molten polymeric material, from at least one of the first and second mold sections to soften and become attached to or fused with the other of the mold section. For example, during the forming step, the softened material is caused to accumulate in a space between the peripheral zones of the first and second mold sections. The method may further comprise the step of subjecting the composition in the mold assembly to conditions effective to form an ophthalmic lens product from the composition. For example, a method may comprise a step of polymerizing or curing the lens precursor composition.

In the illustrated embodiment, the mold assemblies comprise first and second mold sections 22 and 24 shown in FIGS. 1B and 1C, and the bores that are formed in the forming step comprise the channels 57 described herein, each channel being defined by an open ended bore 52 and closed end bore 54.

The bore forming step preferably comprises applying energy to the first and second peripheral regions 42 and 44. The energy may be selected from the group consisting of heat energy, ultrasonic energy, radio energy, light energy, such as laser energy, and various combinations thereof.

Figure 2:
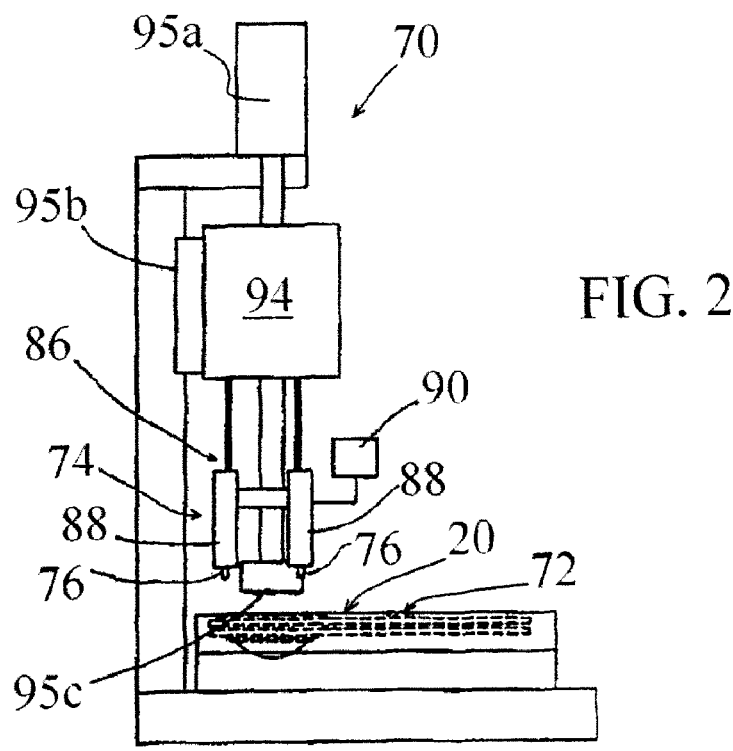
FIG. 2 is a system for producing the present mold assemblies using heat energy.

Referring now to FIG. 1C and FIG. 2, in a related aspect of the invention, a system 70 useful in making ophthalmic lenses is provided. The system 70 generally comprises a surface 72 configured to carry or support a mold assembly, such as mold assembly 20, in a substantially fixed location, and a mechanism 74 useful for forming the open ended bore 52 and the closed ended bore 54 in the peripheral regions 42, 44 of the first and second mold sections 22, 24, as described elsewhere herein. As shown, the surface 72 may have a contour substantially conforming to a contoured surface of the second mold section, so that the mold assembly 20 nests in the surface 72.

The mechanism 74 for forming the bores includes at least one elongated element 76 having a distal tip 77 and positioned and movable relative to the surface 72 so that the distal tip 77 passes, (in distal direction 78) through the first peripheral region 42 and into the second peripheral region 44. The distal tip 77 passes only partially into the second peripheral region 44, so as to form a closed end bore 54. In other words, the closed end bore 54 does not extend entirely through the full thickness of the peripheral region 44.

After the distal tip 77 has penetrated into the second peripheral region 44, the elongated element 76 then reverses direction and moves (in proximal direction 82) out of the second peripheral region 44 and out of the first peripheral region 42. This creates channel 57, which is made up of open ended bore 52 and closed end bore 54 and a region A of fusion between the first peripheral region 42 and the second peripheral region 44.

The process of forming the bores 52 and 54 (e.g. channel 57), in the manner herein described causes the first mold section 22 and the second mold section 24 to become fused or secured together at a discrete "point" or a discrete region between the mold sections 22, 24.

For example, the elongated element 76 may be energized, for example by heat, ultrasound or a combination thereof. In a preferred embodiment, the distal tip 77 (FIG. 1C) of the elongated element 76 is heated, and as the tip 77 is passed into the mold sections 22, 23, the heated tip 77 causes a portion of mold material to become melted or softened. As the elongated element 76 is withdrawn from the peripheral regions, a bleb of melted or softened mold material is carried by the tip 77 and forms a contact region between the first peripheral region and the second peripheral region 42, 44, respectively, thereby creating a weld or region of fusion adjacent the bore formed by the withdrawn elongated element 76.

The elongated element 76 or tip 77 thereof may be heated by pulsed heat or continuous heat. Preferably, the elongated element 76 comprises copper or other suitable material that can be quickly heated and cooled to reduce cycle time. Ultrasonic energy may also be applied to the elongated element 76. For example, ultrasonic energy may be radiated from the distal tip of the elongated element to cause melting or softening of the mold material.

Preferably, the system 70 is structured such that when the elongated element 76 is withdrawn from the newly formed bore, there is no "stringing" of molten mold section material. For example, a port (not shown) in the elongated element may be provided which delivers a burst of coolant (e.g. air or other gas) to the tip 77 thereof in order to reduce stringing.

In the illustrated embodiment, the elongated element 76 and channel 57 formed thereby has a diameter of between about 0.5 mm to about 2.0, for example, about 1.5 nun. In a detailed embodiment, the distal tip 77 of the elongated element 76 has a conical shape with a flat distal end. Other possible configurations include chiseled ends and domed conical ends.

In the embodiment shown, system 70 includes a plurality of the elongated elements 76, more specifically, three elongated elements 76, for forming three preferably equidistantly spaced fused regions (see, for example, FIG. 1A.) Each of the elongated elements 76 is positioned so that the distal tip 77 thereof passes through the first peripheral region 42 and into the second peripheral region 44 at a location spaced apart from where the other elongated elements 76 so pass.

Preferably, the system 70 further comprises a source of energy 86 operatively coupled to the elongated element 76 to provide energy, for example heat energy, to the elongated element 76. The energy is effective in allowing the distal tip 77 of the elongated element 76 to pass through the first peripheral region 42 and into the second peripheral region 44. In system 70, the source of energy 86 comprises individual cartridge heaters 88 connected to elongated elements 76. Exemplary cartridge heaters are commercially available from Cooper Tools in Great Britain, http://www.cooperhandtools.com/europe/contact_us/index.htm. In one specific embodiment, a modified WSD 151 electronically controlled digital soldering station may be used to heat the elongated elements. The temperature control can be adjusted from 50° C. to 550° C.

In some embodiments, the source of energy 86 continuously provides energy to the elongated element 76 during the formation of the bores. In other embodiments, the source of energy 86 intermittently provides energy to the elongated elements 76 as the distal tip 72 passes into and out of the first and second peripheral regions 42 and 44, respectively.

The energy provided to the elongated elements 76 during the bore formation step is an amount of energy that is less than that sufficient to cause any significant or deleterious effect to the contact lens composition located in the lens shaped cavity 26. For example, in embodiments of the invention in which the elongated elements 76 are heated by heat cartridges 88 as shown, heat radiating from the element 76 does not cause substantial heating of the lens composition located at a peripheral edge 89 of cavity 26 (see FIG. 1C). Similarly, in embodiments of the invention in which ultrasonic energy is used in form the bores, the ultrasonic energy does not radiate into the lens composition and cause cavitation thereof.

In some embodiments, a cooling assembly 90 is provided. The cooling assembly 90 is operatively coupled to the elongated element 76 and is effective to cool the resulting closed end bore 54 and open ended bore 52 at or after the time the elongated element 66 is moved out of the first and second peripheral regions 42 and 44, respectively.

Figure 4:
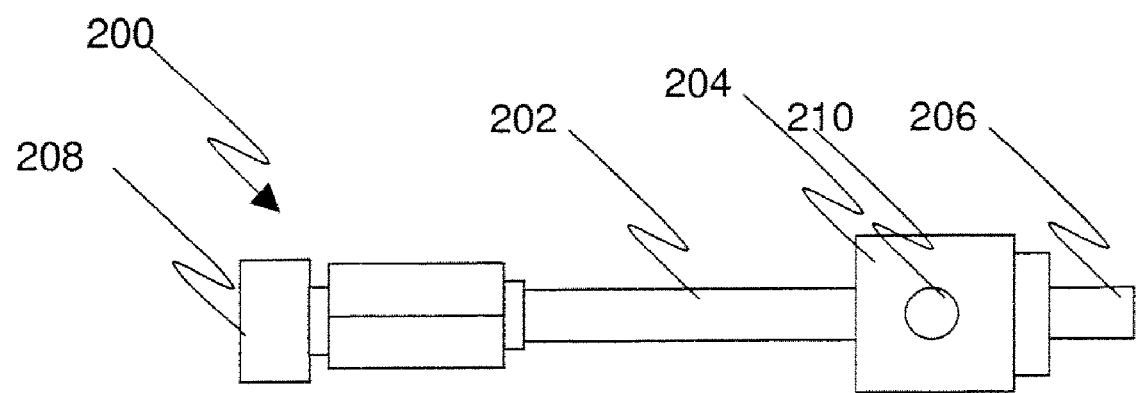
FIG. 4 is an illustration of a vortex tube of a cooling system used in the present methods and systems.

As another example, a cooling assembly can include a vortex tube apparatus 200 (FIG. 4), such as a vortex tube publicly available from Meech Air Technology (United Kingdom). The vortex tube 200 receives compressed air through an inlet 210. The compressed air is directed into a chamber 204 that includes a generator. The air is directed to the generator and the air spins around the central longitudinal axis of the apparatus (e.g., the heat exchange tube 202). The rotating column of air has a greater temperature at the outside of the column compared to the center of the column. The warmer air is vented toward one end 208 (the heated air outlet) of the vortex tube apparatus, and the colder air is directed toward the opposite end 206 (the cold air outlet). A conduit, such as flexible tubing, extends from the cold air outlet of the vortex tube toward the heating elements to effectively deliver cooled air towards the spot welds formed in the contact lens mold assemblies. The vortex tube can cool the air to −60° C. and can heat the air to 110° C. By reducing the air temperature near the spot weld, such as by about 40° C., it is possible to reduce stringing associated with the spot welding procedures, or reduce cycle time, or both, thereby leading to enhanced production efficiency. For a welding apparatus that comprises three heating elements, three cooling nozzles can be provided in proximity to the heating elements. Other combinations of the number of heating elements and cooling nozzles can also be provided.

The system 70 preferably further comprises a drive assembly 94 operatively coupled to a servo motor 95a and slide 95b and the elongated elements 76, provides a mechanism for moving the distal tip 77 of the elongated element 76 into and out of the first and second peripheral regions 42 and 44, respectively. The elongated elements 76 may be spring loaded, for example, using a loss motion spring mechanism, so as to dampen the inward and outward motion of the elements 76 with respect to the mold assembly 20.

In addition, system 70 may also comprise a pneumatic clamp 95c or other element effective to hold the mold assembly 20 against surface 72 during the bore formation step. The clamp 95c is illustrated as having a planar or flat distal end surface that contacts a surface (e.g., the upper surface) of the first peripheral region 42. In addition, the illustrated embodiment of the clamp 95c includes a plurality of cut-outs or apertures to accommodate the elongated elements 76. The clamp 95c may be effective to deliver a pressure/force of between about 0 Newtons to about 2000 Newtons. In a preferred embodiment, the clamp 95C delivers a force of about 150 Newtons to the mold assembly 20 during the bore forming step.

The clamp 95c also comprises a self-correction mechanism. Clamps that include a self-correction mechanism are effective in holding the mold members together with the interfacing surfaces of the mold members parallel to each other. By providing this type of coupling, flash rings of polymerized lens material and lens prisming can be reduced. It can be understood that clamp 95c is structured to reduce formation of flash rings and undesired lens prisms (e.g., thickening of portions of the polymerized lens product) during mold closure.

With appropriate modifications thereto, the systems of the invention may be structured to operate automatically, for example, robotically, and are thus are especially useful when incorporated into high volume production lines for contact lenses.

In other aspects of the invention, one of the mold sections may include a projection forming a discrete contact region or contact point located outward of the filled lens shaped cavity of the assembled mold sections. The bores are generally formed at these contact points.

In some embodiments of the invention, the peripheral region of the mold sections includes one or more recessed regions, for example undercut regions (not shown), for example, dove-tail shaped undercut regions, located between the projections. The undercut regions may be a byproduct of a process used to mold the individual mold sections.

The system 70 is highly adaptable to large scale production/high speed lens manufacturing systems. With appropriate modifications, which will be known and understood by those of skill in the art, the present systems can be structured to operate automatically and/or robotically, for example, as a part of a silicone hydrogel contact lens manufacturing system.

Figure 3:
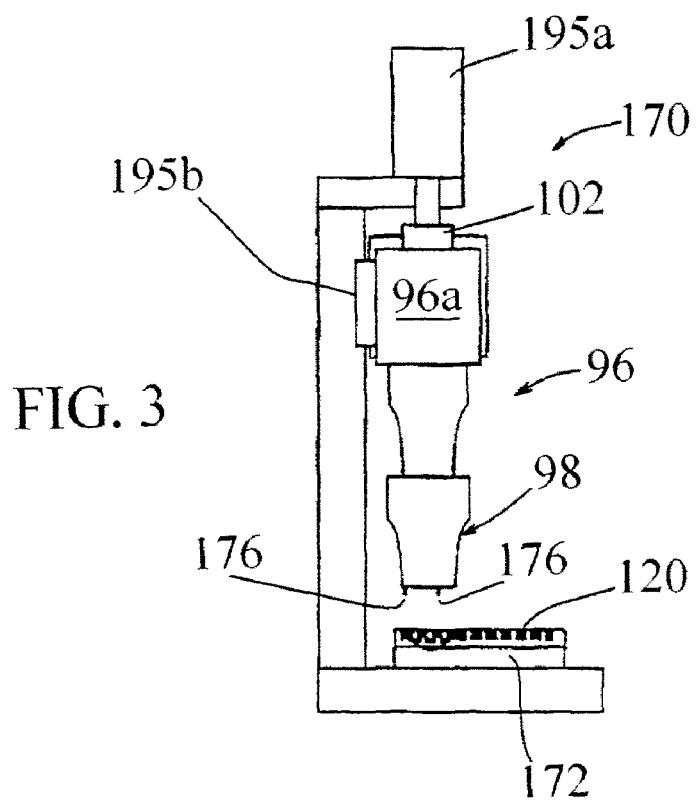
FIG. 3 is another system for producing the present mold assemblies using ultrasonic energy.

Turning now to FIG. 3, another system in accordance with the invention is shown generally at 170. Except as expressly described herein, system 170 is similar to system 70 and features of system 170 which correspond to features of system 70 are designated by the corresponding reference numerals increased by 100.

System 170 is substantially the same as system 70, with the primary difference being that heat energy is replaced by, or is used in conjunction with, ultrasonic energy.

For example, system 170 generally comprises an energy assembly 96 structured and effective to provide vibrational energy, specifically ultrasonic energy, and a horn 98 operatively coupled to the energy assembly 96 having a transducer 96a, and effective to transfer ultrasound energy from the energy assembly 96 to elongated members 176 which are moved into and out of the mold section peripheral regions as described and shown elsewhere herein, to form open ended bore and closed end bore therein.

More particularly, in the exemplary system 170 shown in FIG. 3, the horn 98, having elongated elements 176, is brought into contact with the mold assembly 120 by a servo motor 195a/slide 195b assembly until a series of loss motion springs 102 are compressed. Upon activation of an ultrasonic pulse from the transducer 96a, heat is generated by the elongated elements 176 which melt through the mold sections as a result of the loss-motion compression force, thus fusing or welding the molds together as described elsewhere herein. The horn 98 and elongated members 176 are then retracted by the motor 195a, for example after the melted regions have cooled, thus sealing the mold sections together. The coupled mold assembly 120 is then removed from surface 172.

The ultrasonic energy applied to the elongated members 176 may be typically about 20 kHz to about 40 kHz or higher.

Although the exemplary systems 70 and 179 are generally described as including only three elongated members 76 and 176, it is to be appreciated that other embodiments of the invention may include less than three elongated members, or more than three elongated elements.

In the illustrated embodiment of the invention, the mold assembly comprises polyethylene vinyl alcohol (EVOH) which is a suitable material for ultrasonic welding. It is to be appreciated that other materials, such as other polar resins or contact point mold materials, may be used for making the lens mold sections described herein.

Several factors can affect the weldability of a material by heat and/or ultrasonic energy. One factor is the melting or softening temperature of the mold section material, the higher the melt or softening temperature of a material the more energy is required to cause welding. Another is the stiffness of the material to be welded which generally influences the ability of the material to transmit energy to a joint interface. Typically, a stiffer material has better ultrasound transmission capabilities.

In view of the disclosure herein, an embodiment of the present methods can be described as follows. A method of making a silicone hydrogel contact lens comprises a step of providing a contact lens mold assembly that comprises a contact lens shaped cavity containing a polymerizable silicone hydrogel contact lens precursor composition. The mold assembly comprises a first mold section having a concave lens forming surface, and a second mold section having a convex lens forming surface oriented toward the concave lens forming surface. Each mold section comprises a peripheral region spaced radially away from the each of the respective lens forming surfaces such that the contact lens mold assembly comprises a peripheral region spaced radially outward from the contact lens shaped cavity. The method also comprises forming a plurality of separate spot welds in the peripheral region of the contact lens assembly between the peripheral region of the first mold section and the peripheral region of the second mold section by directing one or more heated elements through the peripheral region of each of the first and second mold sections. The spot welds are effective to physically couple the first mold section and the second mold section together. In some embodiments, the heated element is directed completely through the peripheral regions of both the first and second mold sections to form a continuous open ended bore in the contact lens assembly peripheral region. In other embodiments, the heated element does not pass completely through one of the mold sections to form a closed end bore in one of the peripheral regions of the mold section, as described herein. The methods may also comprise a step of cooling the spot weld formed between the first and second mold sections. For example, a method may comprise directing a cooled gas, such as air, from a vortex tube apparatus toward one or more of the spot welds. The heating element can be removed from the contact lens mold assembly and the assembly can be exposed to polymerizing amounts of radiation to cause the polymerizable silicone hydrogel composition to polymerize and form a polymerized silicone hydrogel contact lens product. The mold assembly containing the polymerized silicone hydrogel contact lens product is then demolded such as by mechanically separating the first and second mold sections, the polymerized silicone hydrogel contact lens product is then delensed from one of the mold sections, such as by contacting the polymerized silicone hydrogel contact lens product and the mold section with a liquid. The delensed product is then placed in contact with an extraction composition, such as a solvent, like alcohol, to remove extractable materials from the product, and is subsequently placed in contact with an aqueous composition to produce a hydrated contact lens. The hydrated contact lens can then be transferred to a package, which is subsequently sealed and sterilized.

Although certain preferred embodiments have been described herein, it is understood that the invention is not limited thereto and modifications and variations would be evident to a person of ordinary skill in the art.

For example, an additional embodiment of the present mold closure systems may comprise using heat to weld two mold members together at a plurality of discrete regions. In one embodiment, heat may be applied at the outer peripheral edge of the assembled mold at discrete regions to form a plurality of contact welds located around the outer perimeter of the assembled mold. In this embodiment, bore holes are not required to attach the two mold members to each other.

Another embodiment may comprise using a heating or heated element to form a bore hole in only one of the mold members. For example, a heatable element may be passed through the top mold member and withdrawn without forming a bore hole in the bottom mold member. For example, heat provided by the heatable element may be sufficient to meld the mold material such that the molten mold material created from the first mold member may melt and contact the second mold member and form a spot weld as the molten material cools between the first and second mold members. Thus, a weld can be obtained by forming a bore in the first mold member and without forming a bore in the second mold member.

What is claimed is:

1. A method of making an ophthalmic lens, the method comprising:
providing a first mold section having a first cavity surface and a first peripheral region extending outward from the first cavity surface to an outer peripheral edge of the first peripheral region;
providing a second mold section having a second cavity surface and a second peripheral region extending outward from the second cavity surface to an outer peripheral edge;
providing a polymerizable composition on at least one of the first and second mold sections;
attaching together the first mold section and the second mold section to define a cavity therebetween containing the polymerizable composition by applying heat energy to a plurality of discrete spaced apart regions, the plurality of discrete spaced apart regions being located along the first peripheral region between the first cavity surface and the outer peripheral edge of the first peripheral region and along the second peripheral region between the second cavity surface and the outer peripheral edge of the second peripheral region, the applying energy being effective to melt mold material from the first peripheral region and the second peripheral region to form molten mold material at the plurality of discrete spaced apart regions, the molten mold material occupying a space between the first mold section and the second mold section thereby causing the first mold section and the second mold section to fuse together to form a mold assembly; and
subjecting the polymerizable composition in the mold assembly to conditions effective to form an ophthalmic lens from the polymerizable composition; wherein the step of applying heat energy comprises passing an elongated element through the first peripheral region and into the second peripheral region.

2. The method of claim 1, wherein the ophthalmic lens is a contact lens.

3. The method of claim 2, wherein the polymerizable composition comprises a polymerizable silicone hydrogel contact lens composition, and the method comprises a method of making a silicone hydrogel contact lens.

4. The method of claim 1, wherein the step of attaching comprises intermittently applying energy to the plurality of discrete spaced apart regions.

5. The method of claim 1, wherein the step of attaching is not associated with stringing of molten material from the first mold section or the second mold section.

6. The method of claim 1, wherein the step of attaching does not form a continuous ring around the cavity of the mold assembly.

7. The method of claim 1, wherein the step of attaching forms discrete spaced apart attachment regions located around the cavity of the mold assembly and between the first peripheral region and the second peripheral region.

8. The method of claim 1, wherein the step of attaching comprises applying energy to at least three discrete spaced apart regions, and the at least three discrete spaced apart regions are equidistantly spaced from each other along the first peripheral region and the second peripheral region.

9. The method of claim 1, wherein the step of attaching comprises fowling at least two welds between the first peripheral region and the second peripheral region.

10. The method of claim 1, wherein a distal tip of the elongated element is tapered or pointed.

11. The method of claim 1, wherein a tip of the elongated element has a conical distal end with a planar distal end surface, has a chiseled distal end with a planar distal end surface, has a dome shaped or convex distal end surface, or has a bore.

12. The method of claim 1, wherein the step of applying heat energy forms at least two hollow spot welds.

13. The method of claim 1, wherein the first mold section and the second mold section comprise a polar resin.

14. The method of claim 1, wherein the first mold section and the second mold section comprise polyethylene vinyl alcohol (EVOH).

15. The method of claim 1, wherein the first mold section and the second mold section are not substantially identically structured.

16. The method of claim 1, wherein the method further comprises the step of clamping and holding in place the first mold section and the second mold section during the attaching step.

17. The method of claim 1, wherein the step of attaching results in an attachment between the first mold section and the second mold section which enables the mold assembly to be subjected to one or more post-attachment procedures without the mold assembly becoming inadvertently misaligned or separated.

18. A method of making an ophthalmic lens, the method comprising:
placing a mold assembly onto a surface configured to carry the mold assembly in a substantially fixed location, the mold assembly comprising first and second mold sections placed together so as to define a cavity therebetween, the cavity containing a polymerizable composition, the first mold section having a first peripheral region extending outward of the cavity to a first mold section outer peripheral edge, and the second mold section having a second peripheral region extending outward of the cavity to a second mold section outer peripheral edge; and
applying heat energy to a plurality of discrete spaced apart regions, the plurality of discrete spaced apart regions being located along the first peripheral region between the cavity and the first mold section outer peripheral edge and along the second peripheral region between the cavity and the second mold section outer peripheral edge, the energy being effective to melt mold material from the first peripheral region and the second peripheral region to form molten mold material at the plurality of discrete spaced apart regions, the molten mold material occupying a space between the first mold section and the second mold section thereby causing the first mold section and the second mold section to fuse together to form the mold assembly; and wherein the step of applying heat energy comprises passing an elongated element through the first peripheral region and into the second peripheral region.

19. The method of claim 18, wherein the step of applying energy comprises continuously applying energy.

20. The method of claim 18, wherein the step of applying heat energy comprises using an elongated element having a distal tip to cause material from at least one of the first peripheral region and the second peripheral region to soften and/or accumulate between the first peripheral region and the second peripheral region.

21. The method of claim 18, wherein the step of applying energy comprises applying energy to at least three discrete spaced apart regions, and the at least three discrete spaced apart regions are equidistantly spaced from each other along the first peripheral region and the second peripheral region.

22. The method of claim 18, wherein the step of applying energy comprises forming at least two welds between the first peripheral region and the second peripheral region.

23. The method of claim 22, further comprising the step of cooling the at least two welds.

24. The method of claim 22, wherein the at least two welds comprise at least two hollow spot welds, and the at least two hollow spot welds are formed by an open ended bore in the first peripheral region and a closed end bore in the second peripheral region.

25. The method of claim 18, wherein the first mold section and the second mold section are substantially identically structured, and are sized and adapted for the production of a contact lens.

26. The method of claim 18, wherein the mold assembly comprises polyethylene vinyl alcohol (EVOH), the mold assembly is sized and adapted for the production of a silicone hydrogel contact lens, the polymerizable composition comprises a polymerizable silicone hydrogel composition, and the method is a method of manufacturing a silicone hydrogel contact lens.

\* \* \* \* \*

UNITED STATES PATENT AND TRADEMARK OFFICE
CERTIFICATE OF CORRECTION

| | | |
|---|---|---|
| PATENT NO. | : 8,147,727 B2 | Page 1 of 1 |
| APPLICATION NO. | : 12/763543 | |
| DATED | : April 3, 2012 | |
| INVENTOR(S) | : Ian Bruce et al. | |

It is certified that error appears in the above-identified patent and that said Letters Patent is hereby corrected as shown below:

On the Title page, Item (57), under "Abstract", in column 2, line 8, delete "foamed" and insert -- formed --, therefor.

On the Title page, Item (57), under "Abstract", in column 2, line 11, delete "foams" and insert -- forms --, therefor.

On the Title page, Item (57), under "Abstract", in column 2, line 12, delete "foaming" and insert -- forming --, therefor.

In the Specifications:

In column 1, line 27, delete "molding cast" and insert -- molding. Cast --, therefor.

In column 11, line 19, delete "1.5 nun." and insert -- 1.5 mm. --, therefor.

In the Claims:

In column 16, line 9, in Claim 9, delete "fowling" and insert -- forming --, therefor.

Signed and Sealed this
Fourth Day of December, 2012

David J. Kappos
*Director of the United States Patent and Trademark Office*